United States Patent
Horn et al.

(10) Patent No.: US 6,570,568 B1
(45) Date of Patent: May 27, 2003

(54) SYSTEM AND METHOD FOR THE COORDINATED SIMPLIFICATION OF SURFACE AND WIRE-FRAME DESCRIPTIONS OF A GEOMETRIC MODEL

(75) Inventors: William P. Horn, Scarsdale, NY (US); Julia Anatolyevna Valuyeva, White Plains, NY (US); James T. Klosowski, Rye, NY (US); Frank Suits, Garrison, NY (US); Gerard Lecina, Suresnes (FR)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 09/686,720

(22) Filed: Oct. 10, 2000

(51) Int. Cl.[7] .................................................. G06T 17/00

(52) U.S. Cl. ...................................... 345/428; 345/521

(58) Field of Search ................................ 345/418, 419, 345/420, 422, 428

(56) References Cited

U.S. PATENT DOCUMENTS

| 5,448,686 A | 9/1995 | Borrel et al. |
| 5,929,860 A | 7/1999 | Hoppe |
| 6,100,902 A | 8/2000 | Horikawa et al. |

OTHER PUBLICATIONS

M. Garland and P. S. Heckbert, "Surface Simplification Using Quadric Error Metrics," Carnegie Mellon Univ., 7 pages.

M. Garland and P. S. Heckbert, "Simplifying Surfaces with Color and Texture Using Quadric Error Metrics," Carnegie Mellon Univ., 8 pages.

P. Cignoni, C. Montani, C. Rocchini, R. Scopigno, "A general method for preserving attribute values on simplified meshes," Istituto di Elaborazione dell'Informazione, pp. 59–66, p. 518.

H. Hoppe, "New Quadric Metric for Simplifying Meshes with Appearance Attributes," Microsoft Research, 8 pages.

Paul S. Heckbert, "Survery [sic] of Texture Mapping," Pixar, *IEEE Computer Graphics and Applications*, Nov. 1986, pp. 321–332.

J. Chen and Y. Han, "Shortest Paths on a Polyhedron," Dept. of Computer Science, Univ. of Kentucky, 1990 ACM, pp. 360–369.

G. Barequet, D. Z. Chen, O. Daescu, M. T. Goodrich, J. Snoeyink, "Efficiently Approximately Polygonal Paths in Three and Higher Dimensions," ACM 1998, pp. 317–326.

D. Eu and G. T. Toussaint, "On Approximating Polygonal Curves in Two and Three Dimensions," School of Computer Science, McGill Univ., Montreal, Quebec, 1994 by Academic Press, Inc., pp. 231–246.

(List continued on next page.)

*Primary Examiner*—Cliff N. Vo
(74) *Attorney, Agent, or Firm*—Louis P. Herzberg (57) ABSTRACT

A system simplifies a geometric model to accelerate the rendering of the geometric model. A surface description of the geometric model is stored in one or more of the system memories. A wire-frame description of the geometric model is also stored. A surface simplification process alters the surface description to create an approximation of the original surface description. A wire-frame draping process drapes the wire-frame description onto the simplified surface and simplifies one or more of the line segments that are draped, the simplified line segments and the simplified surface description are rendered onto a display device.

14 Claims, 8 Drawing Sheets

OTHER PUBLICATIONS

P. Lindstrom, G. Turk, "Fast and Memory Efficient Polygonal Simplification," Georgia Institute of Technology, 7 pages.

P. S. Heckbert and M. Garland, "Survey of Polygonal Surface Simplification Algorithms," School of Computer Science, Carnegie Mellon University, May 1, 1997, pp. 1–29.

Peter Lindstrom, "Out–of–Core Simplification of Large Polygonal Models," Georgia Institute of Tech., *Proceedings of ACM SIGGRAPH 2000*, pp. 1–4.

J. Rossignac and P. Borrel, "Multi–resolution 3D approximations for rendering complex scenes," Interactive Geometric Modeling, IBM TJ Watson Research Center, pp. 455–465.

Fig. 1

(Prior Art)

SYSTEM AND METHOD FOR THE COORDINATED SIMPLIFICATION OF SURFACE AND WIRE-FRAME DESCRIPTIONS OF A GEOMETRIC MODEL

FIELD OF THE INVENTION

This invention relates to the field of computer graphics. More specifically the invention relates to the simplification of geometric models for the purpose of display.

BACKGROUND OF THE INVENTION

In the field of mechanical computer aided design (MCAD), geometric models are sometimes simultaneously represented by wire-frame and surface descriptions. For example, a model may be displayed by using a surface description to render the surface and a wire-frame description to show sharp edges, as in FIG. 2. The simultaneous use of surface and wire-frame descriptions of geometric models is also used for display purposes in other fields in MCAD. One such field is the application of numerical analysis to geometric models.

Numerical methods are frequently used to simulate the response of geometric models to a diverse variety of imposed environments. In one popular numerical method known as the finite element method, geometric models are represented by an assembly of subdivisions called finite elements. Finite elements are interconnected at point locations called nodes. Within a finite element, the value of a dependent variable is completely determined by the value of the dependent variable at nodes of the element. The use of the finite element method to simulate real-world problems is commonly referred to as finite element analysis. An assembly of finite elements is referred to as a finite element mesh. The finite element mesh serves as an alternate representation of the original real or abstract geometric model.

It is common practice to use graphical representations of the finite element mesh and one or more computed results to examine a solution obtained from a finite element analysis. For finite element meshes composed of 2-dimensional or 3-dimensional elements embedded in the 3-dimensional Euclidean space, graphical representations can be used to simultaneously communicate the structure of the finite element mesh, the surface of the finite element mesh (or geometric model) and the scalar magnitude of a solution component. Here polygons (usually triangles) are used to represent the surface of the mesh, line segments are used to represent the boundaries of individual elements, and color is used to represent the scalar magnitude of the solution component (e.g., temperature). Typically, the graphical result is obtained by combining a surface rendering with a line segment rendering. The surface rendering is used to represent the mesh surface and a scalar magnitude either representing or derived from a solution component. The shading is performed by applying shading algorithms. These shading algorithms use as input the geometry of the mesh surface and the color derived from the scalar magnitude of the solution component. The line segment rendering is generated from the edges of individual finite elements in the finite element mesh. The scalar magnitude of the solution component is frequently represented by a single color selected from a banded color map. The banded color map represents a contiguous range of scalar values with a single color. The final rendering usually takes one of two forms. One rendering mode, referred to as the iso mode, is used to represent scalar values attached to nodes and intra-finite element transitions from a color representing one scalar value to a color representing another scalar value. The other rendering mode, referred to as the finge mode, is used to represent scalar values attached to 2-dimensional faces in the mesh. The fringe mode uses one color corresponding to the scalar value to represent the face.

Figure 2:
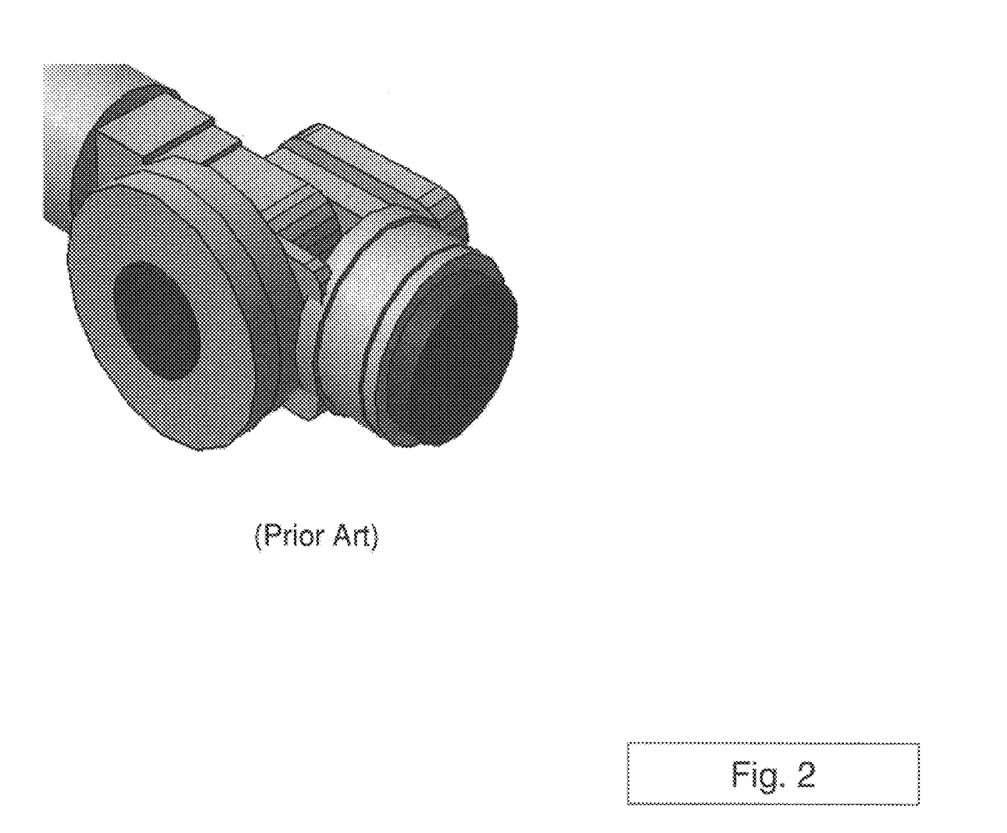
FIG. 2 illustrates simultaneous rendering of a surface description of a geometric model and a wire-frame description of the same model using prior art.

Most of the existing techniques for visualizing surface descriptions of the geometric models utilize triangle meshes. The geometry of a triangle mesh refers to the pair (K, V), where K is a simplicial complex of degree 2 specifying the connectivity of the mesh simplices, and $V=\{v_1, \ldots, v_m\}$ is the set of vertex positions $v_i=(x_i, y_i, z_i)$ defining the shape of the mesh in $R^3$. In the FEM applications, there are either discrete scalar attributes D associated with the faces of the mesh, or scalar attributes S associated with the vertices of the mesh. In the FEM analysis, model descriptions also involve a wire-frame description of a geometric model (finite element mesh). A wire-frame description is represented by a subcomplex $L \subset K$, where L is a degree 1 subcomplex of K. The visualization task is to render either the triple (N, L, V) or one of the quadruples K, L, V, D) (for the fringe rendering mode) or K, L, V, S) (for the iso rendering mode). For example, FIG. 2 is a visualization of some triple (K, L, V).

The graphical detail contained in a visualization is not always required for display. Furthermore, graphical detail may be reduced to increase the display rate by decreasing the required graphics processing. A variety of simplification techniques aimed at reducing the amount of graphics processing and increasing display rates by sacrificing geometric detail have been covered in the literature (see, for example, Garland and Heckbert, "*Survey of Polygonal Surface Simplification Algorithms*", Multiresolution Surface Modeling Course, SIGGRAPH-97). These simplification reduce the graphics processing to increase the frame rates by rendering representations containing lower levels of geometric detail than the original geometric model. Factors such as the size in screen space of the rendered model distance from the viewer, relative importance of the model requested frame rate, relative motion between the viewer and the model, are used to select a simplified representation of the original model. All of these techniques attempt to produce a simplified model that, when rendered, retains as much image fidelity as possible with a rendering of the original model.

There exist several techniques that address the simplification of meshes. In most approaches, the initial meshes are replaced by approximations with fewer faces which produce visually similar results, thereby improving rendering efficiency. Rossignac and Borrel ("Multi-resolution 3D approximations for rendering complex scenes", *Modeling in Computer Graphics*, 455–465 (Springer-Verlag 1993) and U.S. Pat. No. 5,448,686) proposed one of the earliest simplification algorithms. Their algorithm divides the model into cells of a uniform rectangular grid, and replaces all vertices within the grid cell by a single representative vertex.

The edge collapse operation has been used extensively in simplification, and it generally produces higher quality results. Garland and Heckbert ("Surface simplification using quadric error metrics", *Computer Graphics Proceedings, Annual Conference Series*, 1997, 209–216) maintain a 4 by 4 symmetric matrix at each vertex that allows to track square distances to the faces of the original model. They subsequently generalized the quadric error metric to support simplification of surfaces with color and texture ("Simplifyng surfaces with color and texture using quadric error metrics", IEEE *Visualization '98 Proceedings*, October 1998, 263–269). Lindstrom and Turk ("Fast and memory efficient polygonal simplification", IEEE *Visualization '98 Proceedings*, October 1998, 279–286) determine the vertex placement by minimizing the quadratic volume, boundary, and triangle shape objective functions, with the cost of edge collapse determined by the volume and boundary functions. Lindstrom ("Out-of-core simplification of large polygonal models", *Computer Graphics Proceedings, Annual Conference Series*, 2000, 259–262) has proposed a method extending the vertex clustering scheme of Rossignac and Borrel by using quadric error metrics to select the representative vertex for each cell in the uniform grid.

PROBLEMS WITH THE PRIOR ART

Standard techniques exist to simultaneously display wire-frame and surface descriptions of geometric models. However, as the complexity of the geometric model increases, the number of polygons and line segments that need to be rendered to convey the surface description and the wire-frame description grows, and it becomes increasingly difficult for the computer to render the visualization at the rates required for interactive inspection (3 Hz–30 Hz). It is obvious to use prior art techniques from geometric simplification to address the simplification of surface descriptions to increase interactive frame rates. Standard techniques also exist to simplify surface descriptions of geometric models while preserving certain edges. However, there are no prior art techniques which use a simplified surface description of a geometric model to simplify the wire-frame description of the model. Furthermore, prior art does not consider the problem of using computational results attached to a the geometric model to guide the simplification process when viewing results using the fringe mode of display.

OBJECTS OF THE INVENTION

An object of this invention is a system and method for the accelerated rendering of surface and wire-frame descriptions of a geometric model by using a simplification of the surface description to guide the simplification of the wire-frame description.

An object of this invention is a method to use the results obtained from a finite element analysis to guide the simplification of a surface.

SUMMARY OF THE INVENTION

The present invention is a system for simplifying a geometric model to accelerate the rendering of the geometric model. A surface description of the geometric model is stored in one or more of the system memories. A wire-frame description of the geometric model is also stored. A surface simplification process alters the surface description to create an approximation of the original surface description. A wire-frame draping process drapes the wire-frame description onto the simplified surface and simplifies one or more of the line segments that are draped, the draped line segments being rendered over the simplified surface on the rendering device.

BRIEF DESCRIPTION OF THE FIGURES

The foregoing and other objects, aspects, and advantages will be better understood from the following non-limiting detailed description of preferred embodiments of the invention with reference to the drawings that include the following:

FIG. 3 illustrates a model displayed according to the conventional technique (FIGS. 3a and 3b) and the present invention (FIGS. 3c and 3d).

FIG. 6, comprising FIGS. 6a–6e, illustrates a fringe mode display created using the original surface description (FIG. 6a), with a triangulated surface (FIG. 6b), a fringe mode display using a simplified surface description (FIG. 6c), the simplified surface with no simplification performed on boundaries (FIG. 6d), and a simplified surface where simplification was aided by additional geometric constraints on boundaries (FIG. 6e);

DETAILED DESCRIPTION OF THE INVENTION

Figure 1:
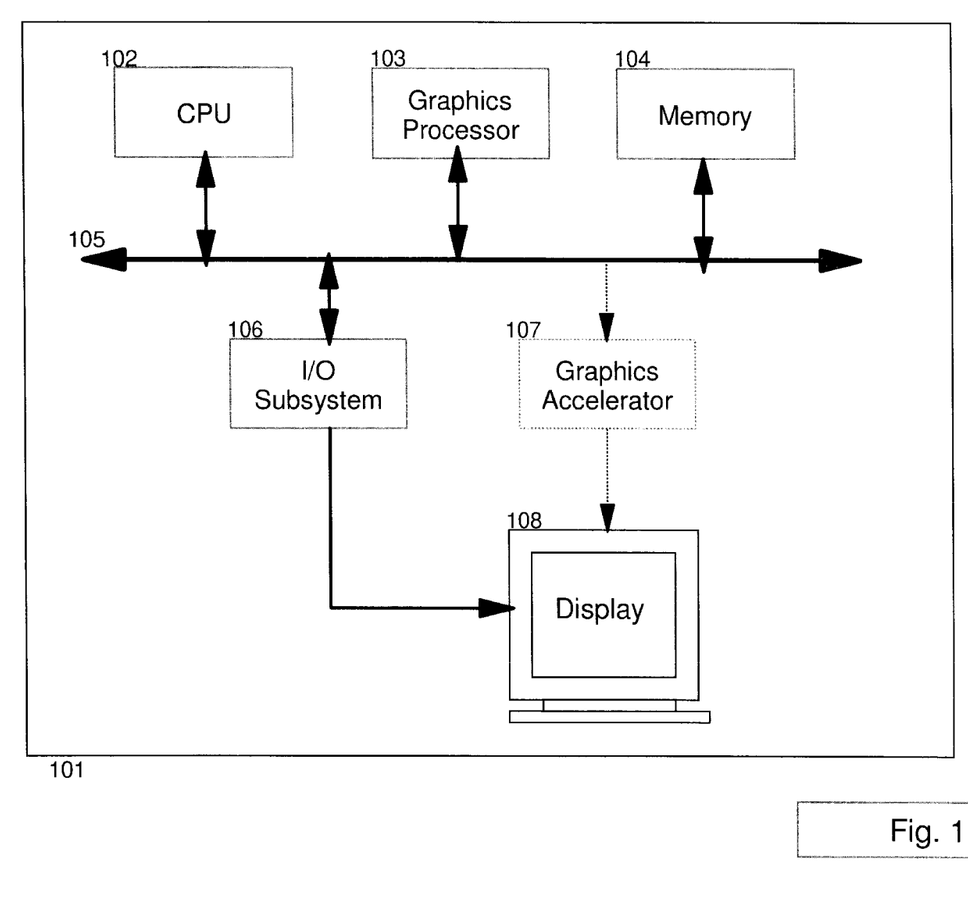
FIG. 1 is a block diagram of a preferred system embodying the present invention.

FIG. 1 is a block diagram showing an overview of a typical environment using the present invention. The computer 101 comprises a memory 104 where one or a plurality of geometric models are stored. A CPU 102 accesses the model via the internal bus 105 and assists a graphics processor 103 in rendering the image and conveying it via the I/O subsystem 106 and the graphics accelerator 107 to the display 108. The present invention can be embodient on a system of FIG. 1 that communicates over one or more networks.

FIG. 2 is prior art representation of a geometric model. These models and the techniques for creating and displaying these models are well known.

Figure 3A:
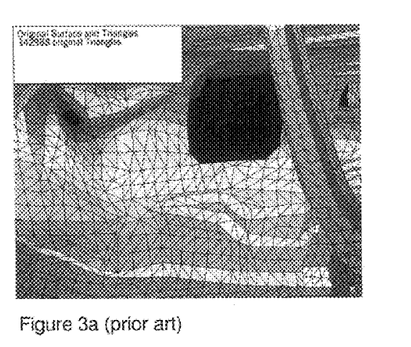
Figure 3B:
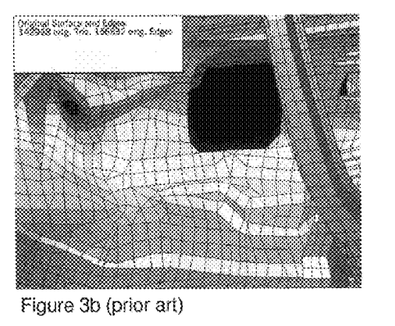
Figure 3C:
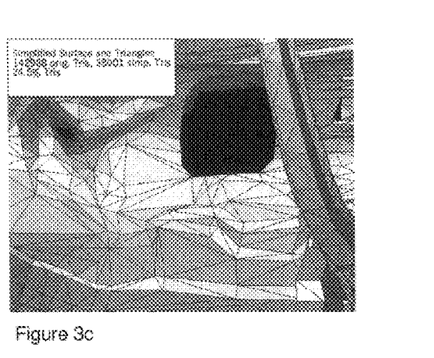
Figure 3D:
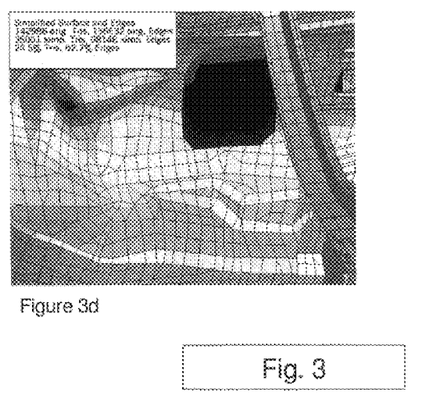

FIG. 3 illustrates a model displayed using conventional techniques (FIGS. 3a and 3b) and the present invention (FIGS. 3c and 3d). The original automobile surface and wire-frame descriptions consist, respectively, of 142988 triangles and 156632 edges of finite elements.

FIG. 3a demonstrates a prior art rendering of a triangulated surface (K, V) of the finite element mesh. In this figure, and in FIG. 3c, the boundaries of triangles have been rendered to show the structure of the surface description. FIG. 3b illustrates a rendering of the same surface along with the prior art edges of the finite elements (K, L, V).

In FIG. 3c, the surface representation of the original finite element mesh (FIG. 3a) has been simplified, reducing the number of triangles to 35001. Any appropriate prior art simplification technique can be used. For examples see the description of FIG. 5 below.

In FIG. 3d, the line segments forming the edges of the finite elements have been draped onto the simplified surface of FIG. 3c, and, with the help of an edge simplification process, the edge count has been reduced to 98146. The image fidelities of FIGS. 3b (original) and 3d (simplified) are comparable, and the reduction of the triangle and edge counts yields a significant reduction in rendering time.

Figure 4:
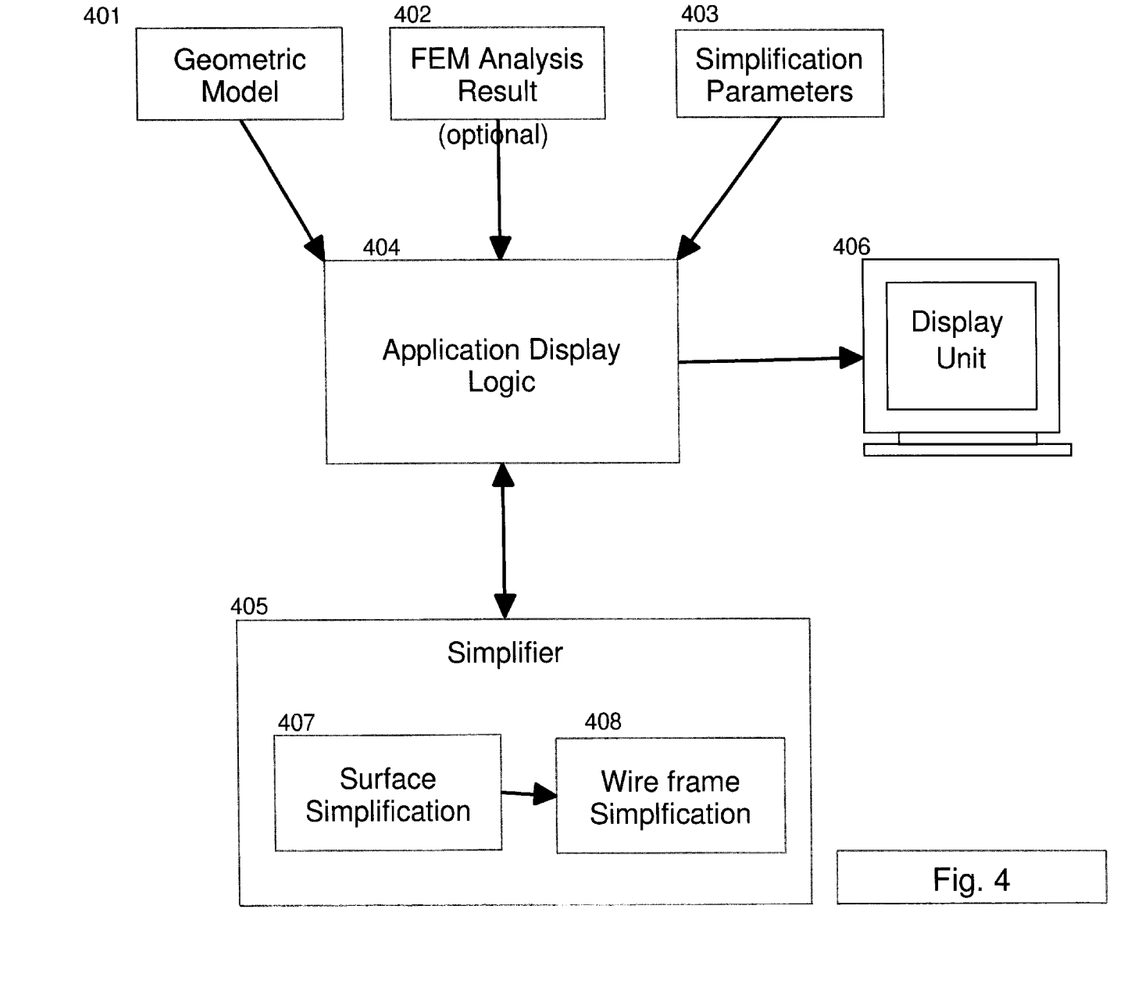
FIG. 4 provides an overview for the preferred application embodying the present invention.

FIG. 4 provides an overview of the preferred application embodying the present invention. Given the geometric model 401, the results of the finite element method analysis 402 (optional), and application-specific parameters 403, the Application Display Logic unit 404 determines a required simplification level. The simplifier 405 comprises the surface simplification module 407 and the line segment simplification module 408. Based on the requested level of simplification, the simplifier 405 generates the approximation to the original representation of the surface description and the wire-frame description. The approximation is sent back to the Application Display Logic unit 404, where it is then rendered on the display unit 406 at a higher frame rate than could have been achieved with the original surface and wire-frame descriptions. One key feature of the present invention is the use of the simplification of the surface description 407 to guide the simplification of the wire-frame description 408.

Figure 5:
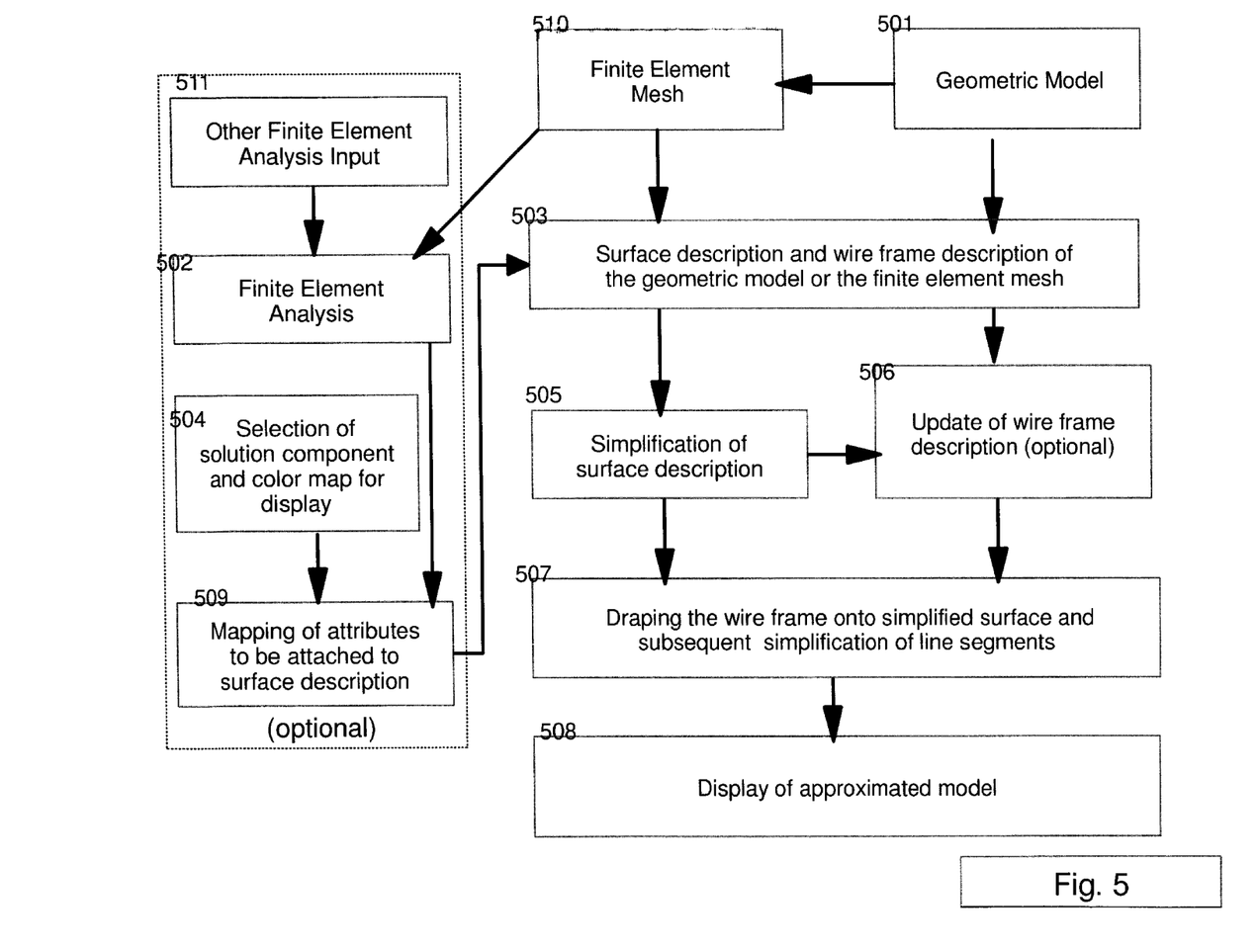
FIG. 5 is a flow chart detailing the coordinated simplification of the surface and wire-frame descriptions of a geometric model for the purpose of display, according to the embodiment of the present invention.

FIG. 5 details the coordinated simplification of the surface and wire-frame descriptions of a geometric model or finite element mesh as performed in the preferred embodiment of the current invention. The simplifier 405 represents the combined functionality of steps 505, 506 and 507. The surface and vire-frame descriptions of the geometric model and/or finite element mesh 503 are extracted from a geometric model 501, a finite element mesh 510, or both. Color attributes may be mapped at step 509 onto the surface description 503 if an (optional) finite element analysis is performed at step 502. The solution component scalar and the color map are chosen by the user or a process at step 504. The solution component scalar is calculated in a finite element analysis 502 based on parameter input from 511 and the finite element mesh 510. The finite element mesh may be derived from a geometric model 501. The surface description is simplified at step 505 utilizing both prior art and elements of the current invention. Elements from the current invention are incorporated at step 503 if color attributes from step 509 are attached to the surface and if the fringe mode of display is chosen. These elements of the current invention are described in FIG. 6. Another feature of the current invention is the optional use of the system to track the simplification of the surface description 505 to update the wire-frame description 506.

U.S. patent application Ser. No. 09/686,780 entitled "APPARATUS, SYSTEM, AND METHOD FOR DRAPING ANNOTATIONS ON TO A GEOMETRIC SURFACE" to Klosowski et, al (hereafter "Draping") and U.S. patent application Ser. No. 09/686,643 entitled "APPARATUS, SYSTEM, AND METHOD FOR SIMPLIFYING ANNOTATIONS ON A GEOMETRIC SURFACE" to Suits et. al (hereafter "Annotation Simplification"), which are filed on the same day as this disclosure and are herein incorporated by reference in their entirety.

At step 507, techniques of "Draping" and "Annotation Simplification" are used to drape the wire-frame description. Updates in the wire-frame description performed in step 506 can be used to accelerate the process. The approximate wire-frame and surface descriptions of 507 are then available for display at step 508.

One key feature of the present invention is the use of the simplification of the surface description 505 to support and guide the projection (draping) of the original wire-frame description 507. There are no prior art techniques which use simplification of the surface description to guide the draping of the wire-frame description onto the simplified surface. Next, we discuss the details of the of the coordinated simplification of the surface description and the wire-frame draping and simplification performed at steps 505 through 507.

In the preferred embodiment, the mesh simplification of the surface description 505 is performed by repeating the edge collapse operation following the work of Garland and Heckbert. An objective function for evaluating the importance of the edge in the model is required to select the next edge for removal. In the illustrated embodiment, a quadric error metric of Gariand and Heckbert is used to evaluate the cost of the edge collapse.

However, if the fringe rendering mode is being used to display the results, then we prohibit the collapse of the edges that are incident on the triangles of different color. Alternatively, we introduce geometric constraints that restrict the simplification of such edges.

Figure 6:
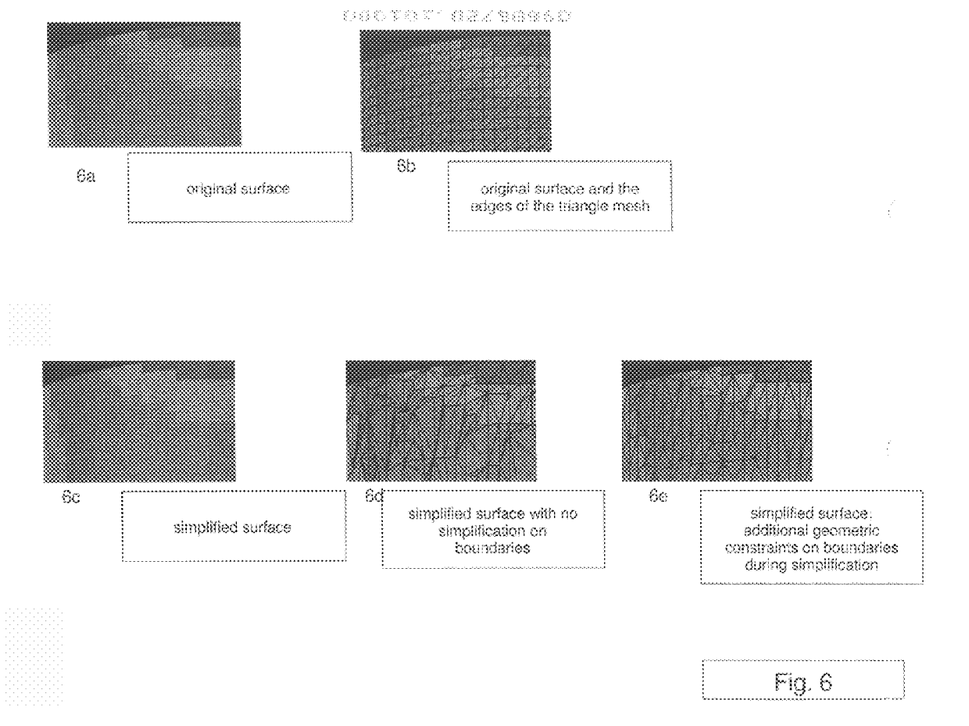

FIG. 6 illustrates the simplification of the triangle mesh guided by the results of the finite element analysis. FIGS. 6a and 6b demonstrate the original triangle mesh. FIG. 6c illustrates the surface of the simplified mesh. FIGS. 6d and 6e demonstrate the simplified triangle meshes obtained using the two approaches. The cylinder model contains 67680 triangles; the simplified models are both comprised of 16000 triangles.

The wire-frame draping and simplification procedures are performed in step 507. The vertices of to the wire-frame description are projected onto the simplified surface, and the projected vertices are reconnected to preserve the original appearance of the line segments. The projection of the vertices may be optionally assisted and accelerated by maintaining the correspondence between the vertices of the original surface description of the model and the vertices of the simplified surface description of the model.

Figure 7:
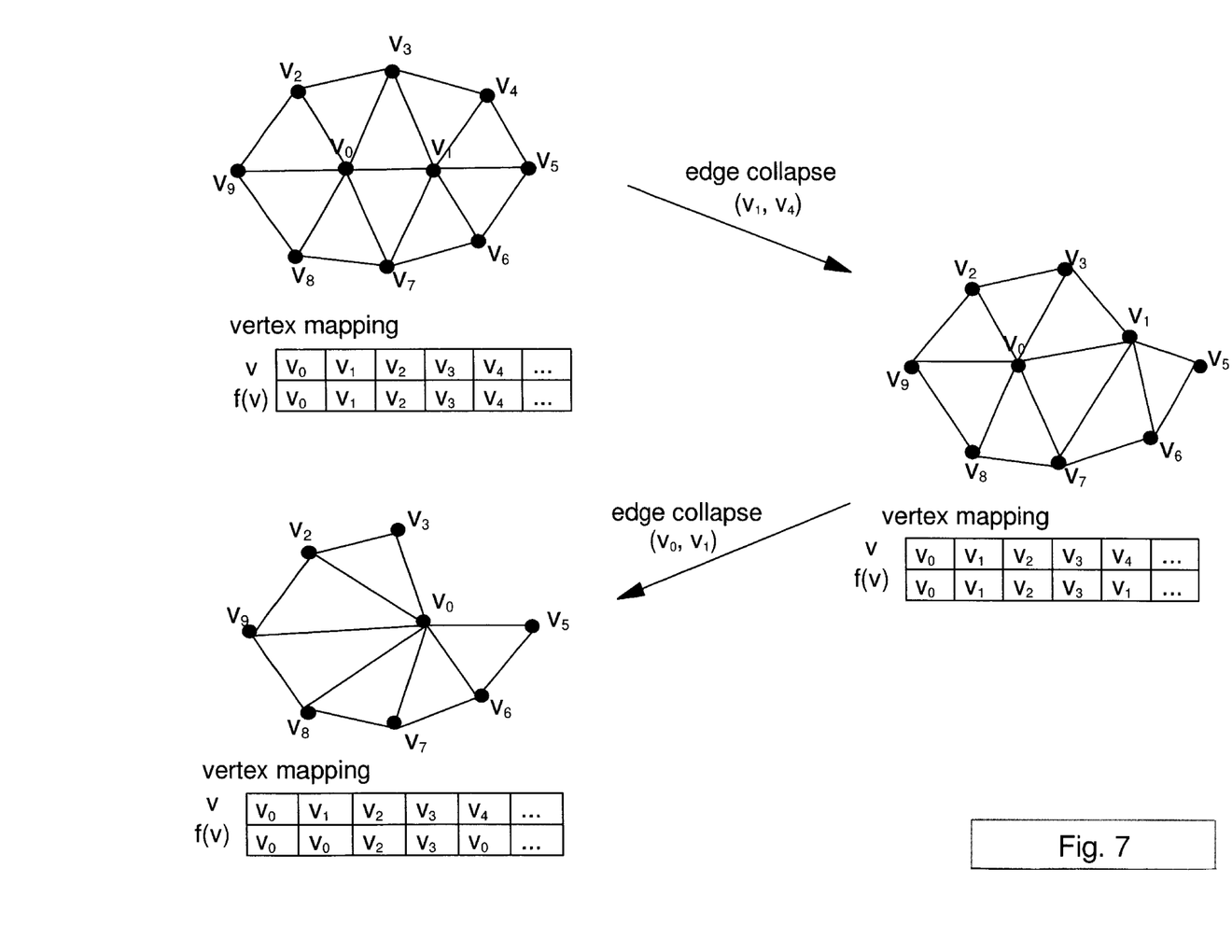
FIG. 7 demonstrates the vertex mapping procedure during a series of edge collapse operations.

This vertex mapping procedure is illustrated on FIG. 7. The mapping f between the vertex sets is maintained at step 506 as follows:

(1) for the original surface description of the model, f is set to be the identity mapping;
(2) if an edge ($v_0$, $v_1$,) has been collapsed to a vertex $v_0$, then put $f(v_1)=v_0$. Also, for all vertices v with $f(v)=v_1$, put $f(v)=v_0$.

Hence, if a vertex v is removed from the simplified surface description, then the mapping f tracks the vertex of the simplified surface f(v) that has been identified with the vertex v after a sequence of edge collapse operations. If FIG. 7, as a result of collapsing the edge ($v_1$, $v_4$), the vertex $v_4$ is identified with the vertex $v_1$ and is removed from the surface description. Thus, $f(v_4)=v_1$. After the collapse of the edge ($v_0$, $v_1$,), the vertex $v_1$, is also removed from the simplified surface, and we set $f(v_1)=v_0$. As a result of the second edge collapse, the vertex $v_4$ has also been identified with the vertex $v_0$ of the simplified surface. Since the vertex $v_1$ is no longer on the simplified surface, we set $f(v_4)=v_0$.

The mapping f reduces the computational expense of the vertex projection operation during the draping of the wire-frame description onto the simplified surface description. The vertex projection of a vertex v of the wire-frame description of a model is evaluated only for the triangles that are incident on the vertex f(v) of the simplified surface description. Of these projections, the projection closest to the vertex v is chosen as the projection of the vertex v onto the simplified surface.

Figure 8:
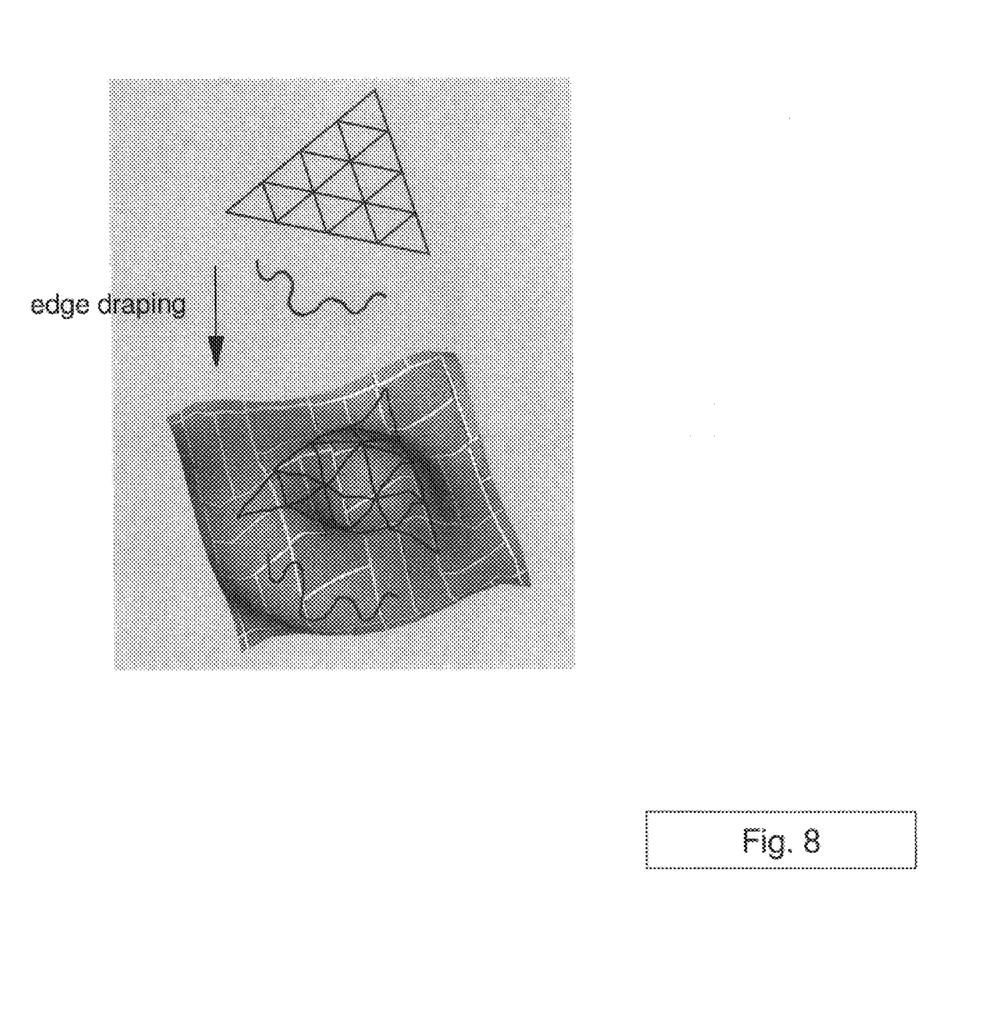
FIG. 8 illustrates the line segment draping operation.

In the preferred embodiment, "Draping" is used to reconnect the projected vertices for each line segment of the wire-frame description. A plane is defined by the midpoint of the original line segment and the two projected end points. This plane is used to create the new line segments that conform to the surface of the simplified mesh. FIG. 8 illustrates the edge draping operation. The result of this process is a new set of geometry for the edges of the wire-frame description that geometrically conforms to the surface of the mesh.

The process of draping, or walking, the edges produces at least as many vertices and edges as the original annotation. On the simplified surface, where multiple triangles have been merged into one, many of the projected edges are not only coplanar, but also nearly collinear. This calls for an edge simplification technique. The algorithm used in the preferred embodiment is based on the "Annotation Simplification". It alters the topology of the annotation without significantly affecting the appearance. For rendering purposes, it is important that the edges remain close to the surface description without penetrating it, while edge position errors within the plane are much less noticeable. The approach is based on directed, a symnietric tolerance. For each of the walked edges, an asymmetric tolerance window is constructed. The simplification of adjacent edges is guided by the projections of the end points onto the plane of the tolerance window, and pivoting the tolerance window as it slides along the simplified edges. This allows greater edge simplification along the simplified surface description than perpendicular to it, and produces a simplified annotation that conforms to the surface yet contains far fewer edges than the original annotation.

We claim:

1. A computer system for accelerating the rendering of a geometric model, the system comprising:
    one or more central processing units (CPUs), one or more memories, and one or more rendering devices;
    a surface description of the geometric model that is stored in one or more of the memories;
    a wire-frame description of the geometric model that is stored in one or more of the memories;
    a surface simplification process that alters the surface description to create an approximation of the surface description to create a simplified surface description;
    a wire-frame draping process that drapes the wire-frame description onto the simplified surface description and then simplifies one or more line segments of the draped wire-frame description to create a simplified wire-frame description; and
    a display that renders the simplified wire-frame description.

2. A system, as in claim 1, where the wire-fame description represents any one or more of the following: one or more edges of elements in a finite element mesh, one or more edges that emphasize a discontinuity of an attribute across an edge of any one or more of the following attributes: a face normal, a texture coordinate, and a color.

3. A system, as in claim 1, where the surface simplification process includes any one or more of the following: the method of Garland and Heckbert, the method of Rossignac and Borrel the method of Lindstrom and Turk, the method of Lindstrom, and a geometric simplification process.

4. A system, as in claim 1, where the surface simplification process is constrained by one or more attributes used in a fringe mode display.

5. A system, as in claim 1, where the wire-frame draping process is accelerated by tracking vertex identification associated with one or more edge collapses during the simplification of the surface description.

6. A system, as in claim 1, where the simplified wire-frame description and the simplified surface description are rendered together on the display.

7. A computer program product comprising a computer usable medium having computer readable program code means embodied therein for causing acceleration of the rendering of a geometric model, the computer readable program code means in said computer program product comprising computer readable program code means for causing a computer to effect the functions of the system of claim 1.

8. A method of accelerating the rendering of a geometric model comprising the steps of:
    storing a surface description of the geometric model;
    Storing a wire-frame description of the geometric model;
    approximating the surface description to create a simplified surface description;
    draping the wire-frame description onto the simplified surface description; and
    simplifying one or more line segments of the draped wire-frame description to create a simplified wire-frame description.

9. A method, as in claim 8, further comprising the step of rendering the simplified wire-frame description.

10. A method, as in claim 8, further comprising the step of:
    evaluating projections of one or more vertices of the wire-frame description only on one or more triangles that are incident on the respective vertex.

11. A computer system for accelerating the rendering of the geometric model, the system comprising:
    means for storing a surface description of the geometric model;
    means for storing a wire-frame description of the geometric model;
    means for approximating the surface description to create a simplified surface description;
    means for draping the wire-frame description onto the simplified surface description; and
    means for simplifying one or more line segments of the draped wire-frame description to create a simplified wire-frame description.

12. An article of manufacture comprising a computer usable medium having computer readable program code means embodied therein for causing acceleration of the rendering of a geometric model, the computer readable program code means in said article of manufacture comprising computer readable program code means for causing a computer to effect the steps of claim 11.

13. A computer program product comprising a computer usable medium having computer readable program code means embodied therein for causing acceleration of the rendering of a geometric model, the computer readable program code means in said computer program product comprising computer readable program code means for causing a computer to effect the steps of claim 11.

14. A computer program product comprising a computer usable medium having computer readable program code means embodied therein for causing acceleration of the rendering of a geometric model, the computer readable program code means in said computer program product comprising computer readable program code means for causing a computer to effect the following steps:
    storing a surface description of the geometric model;
    storing a wire-frame description of the geometric model;
    approximating the surface description to create a simplified surface description;
    draping the wire-frame description onto the simplified surface description; and
    simplifying at least one line segment of the draped wire-frame description to create a simplified wire-frame description.

* * * * *